A. B. WEVER.
CHURN DASHER.
APPLICATION FILED OCT. 24, 1921.
1,409,267.
Patented Mar. 14, 1922.
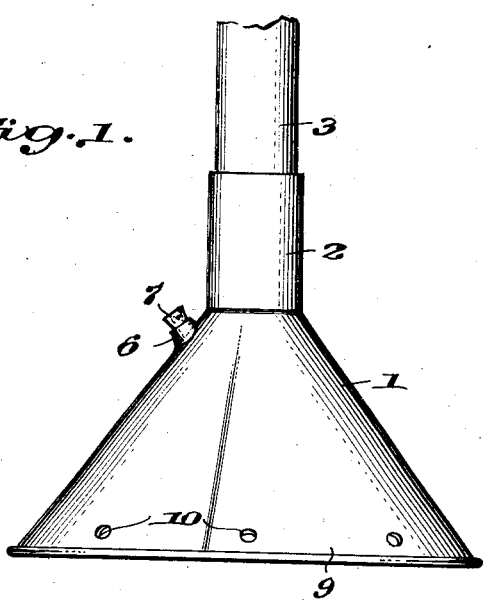
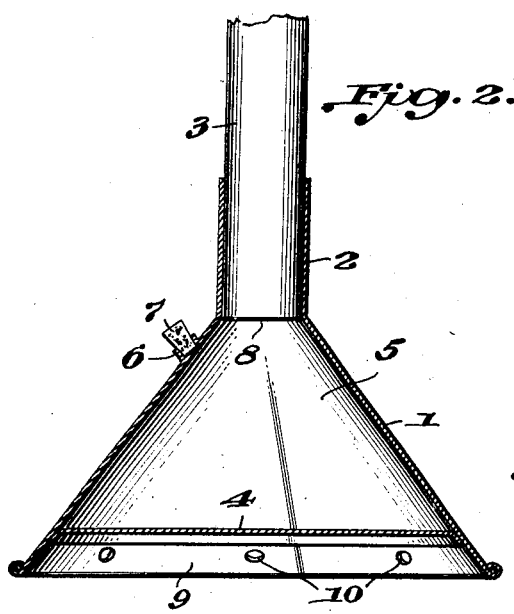
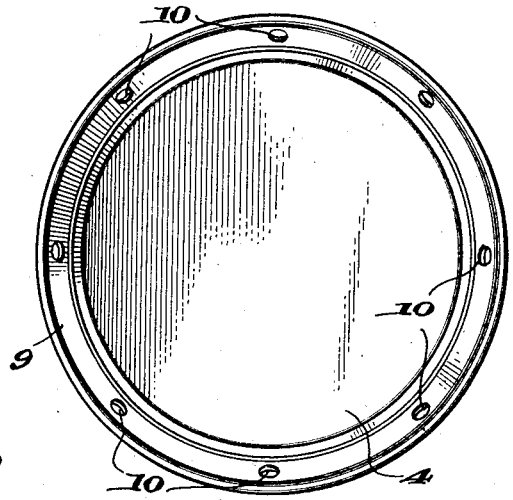
Albert B. Weaver,
Inventor,
By Wm. R. Andrews, Atty.

UNITED STATES PATENT OFFICE.

ALBERT B. WEVER, OF CHIPLEY, FLORIDA.

CHURN DASHER.

1,409,267.    Specification of Letters Patent.    Patented Mar. 14, 1922.

Application filed October 24, 1921. Serial No. 510,132.

*To all whom it may concern:*

Be it known that I, ALBERT B. WEVER, a citizen of the United States, residing at Chipley, in the county of Washington and State of Florida, have invented certain new and useful Improvements in Churn Dashers, of which the following is a specification.

This invention relates to reciprocatory hand operated churn dashers of the general class embodying a metal head provided with a handle which is grasped by the operator and having openings through which the milk is forced during the upward and downward strokes of the dasher.

My improvements reside in the particular construction of the dasher head and the provision therein of a container or chamber for holding hot or cold water which affords the proper temperature for tempering the milk, according to the season of the year, hot water being used in the container in winter and cold water in summer.

The container is closed or sealed, being provided with a suitable filling opening having a closure of any preferred form. Once the hot or cold water is introduced into the container, it remains there and is used as a warming or cooling means for the milk in which the dasher operates. Below the bottom of the container is a flange, skirt, or rim provided with holes through which the milk is forced as the dasher is reciprocated. The flange, skirt, or rim provides beneath the bottom of the water container a chamber into which the milk is forced as the dasher descends and from which the milk passes through the holes in the flange, rim, or skirt, thus breaking up the globules of cream in the process of making butter.

Preferably the dasher is of conical form with a socket or ferrule which receives the handle by which it is manipulated. Modifications may be resorted to within the spirit of the invention which comprises a sealed water container, and a chamber therebelow which is defined by a flange, skirt, or rim having openings.

In the accompanying drawings:

Figure 1 is a side elevation;

Fig. 2 is a vertical section; and

Fig. 3 is a bottom view.

The dasher 1 is of sheet metal, and preferably of conical shape provided at its top with a socket or ferrule 2 which receives the wooden handle 3 by which the dasher is manually operated. The bottom 4 is imperforate; consequently the hollow interior of the dasher comprises a container or chamber 5 which is sealed except for the provision of a suitable filling opening or nipple 6 having a closure 7 which may be a cork, plug, or cap. A partition may be provided to constitute the top of the chamber or container 5, but such is undesirable as the lower end 8 of the handle 3 closes the top of chamber 5. Furthermore, filling or emptying the chamber 5 is more readily accomplished because, on removing the handle 3, the opening in the top of chamber 5 vents the confined air. Hot water may be admitted into the chamber 5 and the closure 7 replaced during those seasons of the year when the milk in the churn should be warmed. In warm weather, cold water may be used in the chamber 5. The provision of the container 5 enables the user to provide such a temperature around the dasher that the milk will be properly tempered and the formation of butter will be facilitated.

Projecting below the bottom 4 is a flange, skirt, or rim 9 which is provided with holes 10 and defines a chamber which encompasses the milk and by the downward motion of the dasher causes the milk contained therein to be forcibly ejected through the holes 10, which results in the breaking up of the globules of cream and facilitates the formation of butter.

I claim:

A conical churn dasher having a sealed bottom, a downwardly flared, perforated, circular flange or skirt extending therebelow forming a chamber below said bottom, a chamber above said bottom adapted to receive water, a ferrule surmounting said chamber and affording a vent therefor, a removable handle having its end tightly frictionally engaged in the ferrule and normally closing said ferrule, said chamber having a filling opening other than said ferrule, and a closure for said filling opening.

In testimony whereof I affix my signature.

ALBERT B. WEVER.